United States Patent
Yamahara (10) Patent No.: US 9,277,174 B2
(45) Date of Patent: Mar. 1, 2016

(54) INFORMATION PROCESSING APPARATUS, INFORMATION PROCESSING METHOD AND INFORMATION PROCESSING PROGRAM

(71) Applicant: Rakuten, Inc., Shinagawa-ku, Tokyo (JP)

(72) Inventor: Hisanori Yamahara, Shinagawa-ku (JP)

(73) Assignee: Rakuten, Inc., Tokyo (JP)

(*) Notice: Subject to any disclaimer, the term of this patent is extended or adjusted under 35 U.S.C. 154(b) by 93 days.

(21) Appl. No.: 14/348,996

(22) PCT Filed: May 31, 2013

(86) PCT No.: PCT/JP2013/065186
§ 371 (c)(1),
(2) Date: Apr. 1, 2014

(87) PCT Pub. No.: WO2014/192133
PCT Pub. Date: Dec. 4, 2014

(65) Prior Publication Data
US 2015/0256794 A1    Sep. 10, 2015

(51) Int. Cl.
*H04N 5/225* (2006.01)
*H04N 7/14* (2006.01)
*H04N 5/77* (2006.01)

(52) U.S. Cl.
CPC . *H04N 7/147* (2013.01); *H04N 5/77* (2013.01)

(58) Field of Classification Search
USPC .......... 348/14.01, 14.02, E7.079, E7.081, 47, 348/51, 211.12, 14.08, 14.09, 207.1, 348/207.11, 207.99, E7.09, 333.12, 576, 348/711; 455/412.1, 414.1, 416
See application file for complete search history.

(56) References Cited

U.S. PATENT DOCUMENTS

| 6,133,945 | A | * | 10/2000 | Stuettler | G02B 27/22 345/419 |
| 2004/0183895 | A1 | | 9/2004 | Kikuchi | |
| 2006/0271978 | A1 | * | 11/2006 | Watanabe | H04N 5/76 725/89 |
| 2012/0155827 | A1 | * | 6/2012 | Kouzuki | H04N 7/142 386/228 |

FOREIGN PATENT DOCUMENTS

| JP | 2003-009104 A | 1/2003 |
| JP | 2004-328069 A | 11/2004 |
| JP | 2007-189624 A | 7/2007 |
| JP | 2011-223323 A | 11/2011 |

* cited by examiner

*Primary Examiner* — Yosef K Laekemariam
(74) *Attorney, Agent, or Firm* — Sughrue Mion, PLLC

(57) ABSTRACT

In a video communication performed by using an imaging unit and a video display device, a communication terminal acquires a video captured by the imaging unit, stores at least a part of the acquired video in a storing unit, and determines a video of a predetermined interval after a start of the video communication being currently in progress from the stored video, as a replacement video. Then, the communication terminal is triggered when a predetermined start condition is satisfied during the output of the video captured by the imaging unit, and outputs the replacement video instead of the video.

20 Claims, 3 Drawing Sheets

INFORMATION PROCESSING APPARATUS, INFORMATION PROCESSING METHOD AND INFORMATION PROCESSING PROGRAM

CROSS REFERENCE TO RELATED APPLICATIONS

This application is a National Stage of International Application No. PCT/JP2013/065186 filed May 31, 2013, the contents of all of which are incorporated herein by reference in their entirety.

TECHNICAL FIELD

The present invention relates to a technical field of system and the like which transmit a video of a user captured by a camera to a terminal of a partner communicating with the user.

BACKGROUND ART

In the past, there have been known video telephone systems that make a call by transmitting a video captured by a camera, together with a voice, to a communication partner. In such video telephone systems, a video of a transmitting side is continually transmitted to a receiving side. At this time, there are cases where the user of the transmitting side is placed in a situation that is not appropriate to speak to the user of the receiving side. For example, a situation in which the user of the transmitting side suddenly leaves his or her seat or a situation in which a ringtone is rung in the mobile phone of the user is considered. In such a case, there is a problem that gives a feeling of distrust or discomfort to the user of the receiving side who watches the video of the user of the transmitting side.

On the other hand, Patent Literature 1 discloses a system that is configured to previously set a camera image transmission to ON and OFF in a storage unit. When set to ON, a video from a camera unit can be automatically switched and transmitted, and when set to OFF, an image or a video (illustration, self-portrait, an arbitrary video, and the like) previously stored in the storage unit can be automatically switched and transmitted.

PRIOR ART LITERATURE

Patent Literature

Patent Literature 1: JP 2003-009104 A

SUMMARY OF THE INVENTION

Problem to be Solved by the Invention

However, as disclosed in Patent Literature 1, an appearance of a user of a transmitting side is not transmitted if just transmitting a video after an image or a video previously stored in a storage unit before a start of a video telephone call being currently in progress is switched to a video from a camera unit. Therefore, it is difficult to avoid giving an uneasy feeling or the like to a user of a receiving side.

The present invention has been made with attention as an example of the above problem and is directed to provide an information processing apparatus, an information processing method, and an information processing program, which can avoid giving an uneasy feeling to a user of a receiving side.

Means for Solving the Problem

In order to solve the above problem, the invention according to claim 1 is an information processing apparatus, which outputs a video captured by an imaging means in a video communication performed by using the imaging means and a video display device, the information processing apparatus comprising:
an acquiring means that acquires the video captured by the imaging means;
a storage controlling means that stores at least a part of the video acquired by the acquiring means in a storing means;
a determining means that determines a video of a predetermined interval after a start of a video communication being currently in progress from the video stored in the storing means, as a replacement video; and
an outputting means that is triggered when a predetermined start condition is satisfied during the output of the video captured by the imaging means, and outputs the replacement video instead of the video.

According to the present invention, since the video of the predetermined interval after the start of the video communication being currently in progress, instead of the video captured by the imaging means, is output as the replacement video, it is possible to avoid giving an uneasy feeling or the like to the user of the video receiving side.

The invention according to claim 2 is the information processing apparatus according to claim 1, further comprising:
a first detecting means that detects a change in a capturing target person appearing in the video acquired by the acquiring means from the video during the output of the replacement video,
wherein the storage controlling means stores at least a video of an interval, which indicates a process of the change detected by the first detecting means, in the storing means, and
the outputting means outputs the video of the interval indicating the process of the change following the replacement video.

According to the present invention, since the videos before and after the change in the capturing target person can be naturally connected, it is possible to avoid giving an uneasy feeling or the like to the user of the video receiving side.

The invention according to claim 3 is the information processing apparatus according to claim 1 or 2, further comprising:
an information acquiring means that acquires information indicating an action of a person watching the video displayed by the video display device,
wherein the outputting means outputs the replacement video indicating an action of the capturing target person, which is matched with an action indicated by the information acquired by the information acquiring means, instead of the video captured by the imaging means.

According to the present invention, since the user of the video receiving side is allowed to recognize that the user of the video transmitting side performs the action matched with the user of the video receiving side, it is possible to avoid giving an uneasy feeling or the like to the user of the video receiving side.

The invention according to claim 4 is the information processing apparatus according to any one of claims 1 to 3, further comprising:
a second detecting means that detects a predetermined action of the capturing target person appearing in the video acquired by the acquiring means, from the video, wherein the outputting means is triggered when the predetermined action is detected by the second detecting means during the output of the video captured by the imaging means, and outputs the replacement video instead of the video captured by the imaging means.

According to the present invention, if the user of the video transmitting side just performs the predetermined action, the replacement video can be output instead of the video captured by the imaging means.

The invention according to claim 5 is the information processing apparatus according to any one of claims 1 to 3, further comprising:

a first determining means that determines whether a sound generated at a place where the capturing target person appearing in the video acquired by the acquiring means is located belongs to a predetermines sound type, wherein the outputting means is triggered when it is determined by the first determining means that the sound belongs to the predetermined sound type during the output of the video captured by the imaging means, and outputs the replacement video instead of the video captured by the imaging means.

According to the present invention, since the replacement video can be transmitted instead of the video captured by the imaging means even if the user of the video transmitting side does not perform any special action, it is possible to save time and effort of the user of the video transmitting side.

The invention according to claim 6 is the information processing apparatus according to any one of claims 1 to 5, further comprising:

a second determining means that determines whether the capturing target person appearing in the video acquired by the acquiring means is in a situation of speech, wherein the outputting means outputs the replacement video indicating communication failure when it is determined by the second determining means that the capturing target person is in a situation of speech during the output of the video captured by the imaging means.

According to the present invention, even in a case where the user of the video transmitting side is not in a situation suitable for speech, it is possible to secure a time until the user of the video transmitting side speaks.

The invention according to claim 7 is the information processing apparatus according to any one of claims 1 to 6, wherein when the output of the entire replacement video determined by the determining means is completed during the output of the replacement video, the outputting means repetitively outputs the already output replacement video.

According to the present invention, even in a case where the output time of the replacement video is increased and the replacement video is insufficient, the transmission of the replacement video can be continued.

The invention according to claim 8 is the information processing apparatus according to claim any one of claims 1 to 7, wherein the outputting means outputs a video in which a partial region of the video captured by the capturing means is replaced with a partial region containing the capturing target person appearing in the replacement video.

According to the present invention, when there is a target desired to be shown to the user of the video receiving side in the regions other than the partial region of the video captured by the imaging means, the target can be shown to the user of the video receiving side.

The invention according to claim 9 is sn information processing method, which is executed by a computer outputting a video captured by an imaging means in a video communication performed by using the imaging means and a video display device, the information processing method comprising:

a step of acquiring the video captured by the imaging means;

a step of storing at least a part of the acquired video in a storing means;

a step of determining a video of a predetermined interval after a start of a video communication being currently in progress from the video stored in the storing means, as a replacement video; and a step of being triggered when, a predetermined start condition is satisfied during the output of the video captured by the imaging means, and outputting the replacement video instead of the video.

The invention according to claim 10 is sn information processing program which causes a computer configured to output a video captured by an imaging means in a video communication performed by using the imaging means and a video display device, to execute:

a step of acquiring the video captured by the imaging means;

a step of storing at least a part of the acquired video in a storing means;

a step of determining a video of a predetermined interval after a start of a video communication being currently in progress from the video stored in the storing means, as a replacement video; and a step of being triggered when a predetermined start condition is satisfied during the output of the video captured by the imaging means, and outputting the replacement video instead of the video.

This information processing program is recorded on a computer-readable recording medium.

Advantageous Effect of the Invention

According to the present invention, since the video of the predetermined interval after the start of the video communication being currently in progress, instead of the video captured by the imaging means, is output as the replacement video, it is possible to avoid giving an uneasy feeling or the like to the user of the video receiving side.

MODE FOR CARRYING OUT THE INVENTION

Hereinafter, embodiments of the present invention will be described with reference to the drawings. Also, embodiments described below are embodiments in a case where the present invention is applied to a video telephone system that performs a video communication by using an imaging means and a video display device.

[1. Schematic Configuration and Function of Video Telephone System S]

Figure 1:
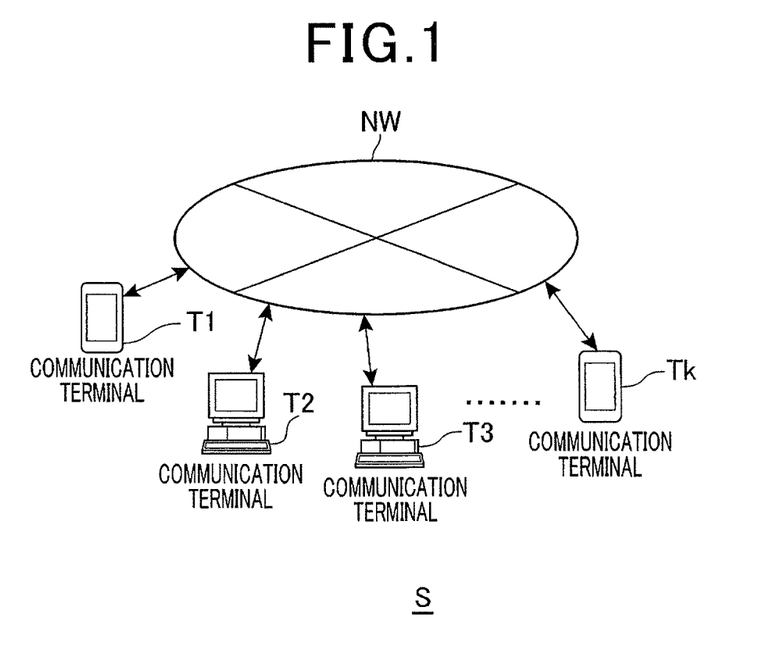
FIG. 1 is a diagram illustrating an example of a schematic configuration of a video telephone system S according to the present embodiment.

First, a schematic configuration and function of a video telephone system S according to an embodiment of the present invention will be described with reference to FIG. 1. FIG. 1 is a diagram illustrating an example of a schematic configuration of a video telephone system S according to the present embodiment. As illustrated in FIG. 1, the video telephone system S includes communication terminals Tn (n=1, 2, 3 ... k). The communication terminals Tn are an example of an information processing apparatus of the present invention. The communication terminals Tn are, respectively, connectable to a network NW. The network NW is constructed by, for example, Internet, a mobile communication network (including a base station and the like), a gateway, or the like. The communication terminal Tn can communicate with other communication terminal Tn by using, for example, an Internet Protocol (IP) protocol through the network NW. Also, for example, a personal computer, a mobile phone, a mobile terminal such as a smartphone, and the like can be applied as the communication terminal Tn.

Figure 2A:
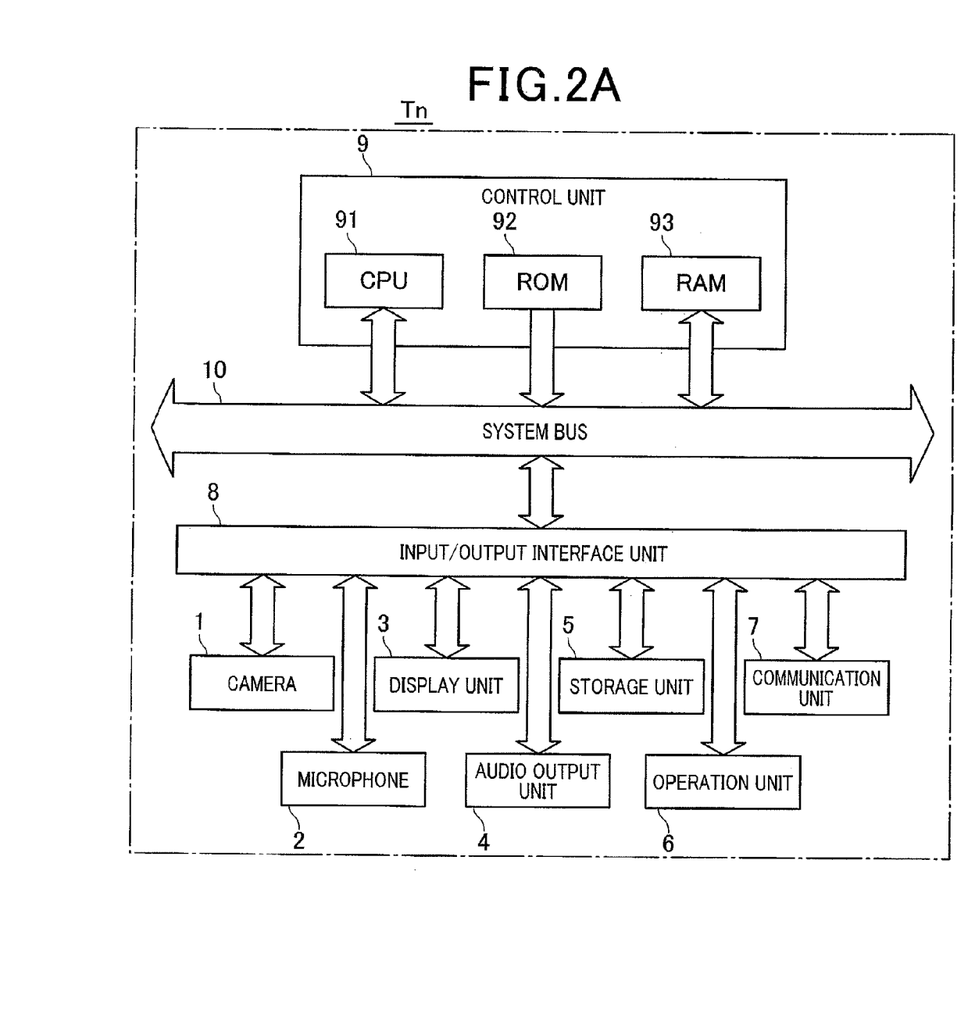
FIG. 2A is a diagram illustrating an example of a schematic configuration of a communication terminal Tn.

FIG. 2A is a diagram illustrating an example of a schematic configuration of the communication terminal Tn. As illustrated in FIG. 2A, the communication terminal Tn includes a camera 1 (example of an imaging means), a microphone 2, a display unit 3, an audio output unit 4, a storage unit 5, an operation unit 6, a communication unit 7, an input/output interface unit 8, and a control unit 9. The camera 1, the microphone 2, the display unit 3, the audio output unit 4, the storage unit 5, the operation unit 6, and the communication unit 7 are connected to the input/output interface unit 8. Also, the input/output interface unit 8 and the control unit 9 are connected through a system bus 10.

The camera 1 captures a user of the communication terminal Tn as a capturing target person when a video communication is performed through the network NW, for example, in a video teleconference between users of the communication terminals Tn. Also, the camera 1 may not be mounted on the communication terminal Tn, and may be an external camera connected to the communication terminal Tn. The microphone 2 collects the user's voice or the like in synchronization with the capturing by the camera 1.

The display unit 3 includes a display, and displays a video on the display according to a video signal output from the control unit 9. The video signal is, for example, a video signal representing a user video of a communication terminal Tn of a communication partner. The audio output unit 4 includes a speaker, and outputs an audio from the speaker to the outside according to an audio signal output from the control unit 9. The audio signal contains, for example, a voice of a user of a communication terminal Tn of a communication partner.

The storage unit 5 includes, for example, a flash memory, a hard disk drive, or the like, and stores various programs, such as an operating system and a video telephone program (including an information processing program of the present invention). The information processing program of the present invention is a program that causes the control unit 9 to execute each step of the present invention. The information processing program of the present invention may be an application program that is provided separately from the video telephone program. Also, the video telephone program, for example, may be downloaded from a predetermined server or the like through the network NW, or may be stored in and read from a predetermined recording medium.

The operation unit 6 includes a plurality of operation buttons for receiving a user's instruction, and outputs an instruction signal to the control unit 9 according to the operation button pressed by the user. The communication unit 7 is connected to the network NW and performs a control of a normal state.

Figure 2B:
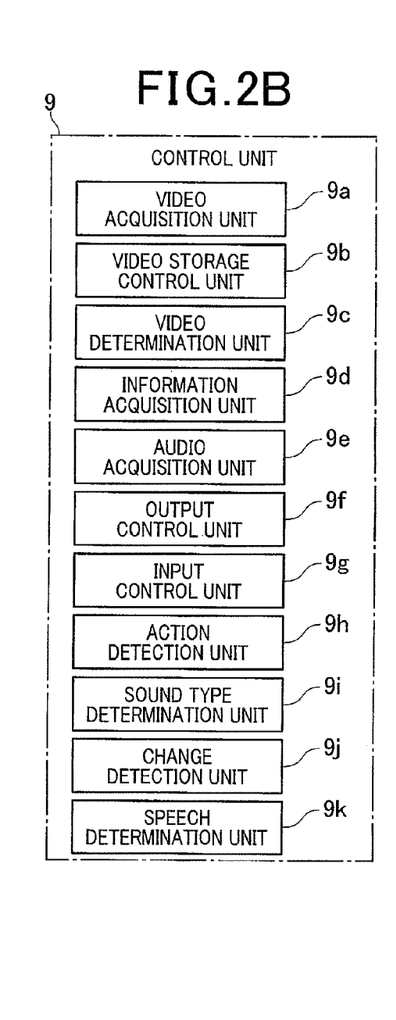
FIG. 2B is a diagram illustrating an example of a function block of a control unit 9.

The control unit 9 includes a central processing unit (CPU) 91, a read only memory (ROM) 92, a random access memory (RAM) 93, and the like. FIG. 2B is a diagram illustrating an example of a function block of the control unit 9. The control unit 9 as a computer performs processing to be described below according to the video telephone program stored in the storage unit 5. In such processing, as illustrated in FIG. 2B, the control unit 9 functions as a video acquisition unit 9a, a video storage control unit 9b, a video determination unit 9c, an information acquisition unit 9d, an audio acquisition unit 9e, an output control unit 9f, an input control unit 9g, an action detection unit 9h, a sound type determination unit 9i, a change detection unit 9j, and a speech determination unit 9k. Also, the RAM 93 or the storage unit 5 constitutes a storing means of the present invention. For example, in the RAM 93 or the storage unit 5, a video storage area is allocated for temporarily storing a video captured by the camera 1.

Also, the video acquisition unit 9a is an example of an acquiring means of the present invention. The video storage control unit 9b is an example of a storage controlling means of the present invention. The video determination unit 9c is an example of a determining means of the present invention. The information acquisition unit 9d is an example of an information acquiring means of the present invention. The output control unit 9f is an example of an outputting means of the present invention. The action detection unit 9h is an example of a second detecting means of the present invention. The sound type determination unit 9i is an example of a first determining means of the present invention. The change detection unit 9j is an example of a first detecting means of the present invention. The speech determination unit 9k is an example of a second determining means of the present invention.

The video acquisition unit 9a acquires a video captured by the camera 1 as a video signal. The video storage control unit 9b stores at least a part of the video captured by the video acquisition unit 9a (hereinafter, referred to as "real-time video") in the video storage area (hereinafter, referred to as "real-time video storage area"). That is, the entire real-time video acquired by the video acquisition unit 9a may not be stored in the real-time video storage area. Incidentally, the video storage control unit 9b may be configured to store only a video in which a capturing target person appears, in the real-time video storage area. Then, the video determination unit 9c determines a video of a predetermined interval after a start of a video communication being currently in progress from the video stored in the real-time video storage area, as a replacement video (hereinafter, referred to as "dummy video"). For example, from the video stored in the real-time video storage area, a video of a predetermined interval during which a capturing target person appears is determined as the dummy video. However, the predetermined interval during which the capturing target person appears may include an interval during which the capturing target person is out of a capturing range for several seconds, for example, in order for the capturing target person to tie his or her shoelaces.

As an example of determining the dummy video, the video determination unit 9c detects a person region from a plurality of image frames constituting the real-time video stored in the real-time video storage area, and tracks the detected person region in the plurality of image frames. Then, the video determination unit 9c determines the plurality of image frames of an interval during which a change in the tracked person region is equal to or less than a preset threshold value, as the dummy video, among the plurality of image frames including the tracked person region. Herein, the "threshold value" is set such that a video of an interval during which an action of a capturing target person does not greatly change is determined. This is to the effect that a video of an interval during which the capturing target person performs the action of leaving his or her seat or the capturing target person performs the action of taking the mobile phone is excluded from the dummy video. By making the change in the person region equal to or less than the threshold value, a video of an interval during which the capturing target person stops is contained in the dummy video, but there are cases where a video of an interval during which the capturing target person moderately moves is natural. Therefore, in order to determine the video of the interval during which the capturing target person moderately moves as the dummy video, it may be configured such that a plurality of image frames of an interval during which the change in the tracked person region is equal to or greater than a preset first threshold value and equal to or less than a second threshold value (greater than the first threshold value) is determined as the dummy video.

As described above, the determined dummy video is temporarily stored in a dummy video storage area that is separate from the real-time video storage area. Incidentally, since various known methods, such as a person face detecting method or a person tracking method by optical flow, can be used for the detection of the person region, a detailed description thereof will be omitted.

The information acquisition unit 9d acquires information indicating a predetermined action of a person (a user of a video receiving side) who watches a real-time video displayed by a communication terminal Tn of a communication partner (hereinafter, referred to as "action of a communication partner side"). The information indicating the action of the communication partner side is acquired from, for example, a video signal received by the communication unit 7 and input by the input control unit 9g. Herein, examples of the action of the communication partner side may include a laughing action, an applauding action, and the like. Incidentally, a laughing state can be detected by a known face recognition method.

The audio acquisition unit 9e acquires an audio collected by the microphone 2 as an audio signal. The collected audio contains not only a voice of the capturing target person but also a sound generated at a place where the capturing target person is located (hereinafter, referred to as "external sound"). Examples of the external sound may include a chime, a ringtone of a mobile phone, and the like.

The output control unit 9f outputs the real-time video acquired by the video acquisition unit 9a to the communication unit 7. Incidentally, in a case where the information processing program of the present invention is constituted separately from the video telephone program, the output control unit 9f outputs the real-time video acquired by the video acquisition unit 9a to the video telephone program. The real-time video output from the output control unit 9f is transmitted through the communication unit 7 and the network NW to one or a plurality of communication terminals Tn (example of a video display device) of the communication partners. Then, the output control unit 9f is triggered when satisfying a predetermined start condition to be described (hereinafter, referred to as "dummy video transmission start condition") during the output of the real-time video, and outputs the dummy video determined by the video determination unit 9c, instead of the real-time video, to the communication unit 7 or the video telephone program. Thus, the dummy video output from the output control unit 9f is transmitted through the communication unit 7 and the network NW to one or a plurality of communication terminals Tn of the communication partners. Also, the output control unit 9f may be configured to output the real-time video by replacing a partial region of the real-time video with a partial region containing the capturing target person appearing in the dummy video. In this case, the partial region containing the capturing target person is cut out from the image frames constituting the determined dummy video, and the cut-out region is fitted to the partial region of the real-time video (region of the same coordinate position as the cut-out region). Thus, when there is a target desired to be shown to the user of the video receiving side in the regions other than the partial region of the real-time video (region replaced in the region of the dummy video), the target can be shown to the user of the video receiving side.

Also, the output control unit 9f may be configured to output the dummy video matched with the action of the communication partner side, which is indicated by the information acquired by the information acquisition unit 9d, instead of the real-time video. Thus, it is possible to allow the user of the video receiving side to recognize that the user of the video transmitting side performs the action matched with the user of the video receiving side. For example, when the action of the communication partner side is the laughing action, the dummy video containing the laughing action is transmitted. Alternatively, when the action of the communication partner side is the applauding action, the dummy video containing the applauding action is output. In this case, the video determination unit 9c is configured to extract the dummy videos corresponding to the respective actions from the real-time video, divide the extracted dummy videos, for example, with respect to each action (laugh, applaud, and the like) according to genre, and store the divided dummy videos in the dummy video storage area.

Incidentally, the real-time video or the dummy video is encoded, and the encoded video signal is multiplexed with an encoded audio signal acquired by the audio acquisition unit 9e and is transmitted as stream data. Also, the transmission of the dummy video is ended when a dummy video transmission end condition is satisfied.

The input control unit 9g inputs the stream data that is transmitted from the communication terminal Tn of the communication partner through the network NW and is received by the communication unit 7. Then, the input control unit 9g separates the video signal and the audio signal from the input stream data, decodes the video signal and the audio signal, outputs the video signal to the display unit 3, and outputs the audio signal to the audio output unit 4.

The action detection unit 9h detects a predetermined action of the capturing target person appearing in the real-time video, which is acquired by the video acquisition unit 9a, from the real-time video. The "detection of the predetermined action of the capturing target person" is an example of the dummy video transmission start condition described above. For example, as the "predetermined action", a video indicating an "action in which a person snoozes while swinging his or her head back and forth or left and right", an "action in which a person snoozes while closing his or her eyes for more than several seconds", an "action in which a person stands up", or an "action in which a person turns to the left or right" is previously registered. Then, the action detection unit 9h, for example, compares the registered action with the person region detected from the real-time video, and detects the action when the similarity is equal to or greater than a preset threshold value. Incidentally, a state of snoozing while closing eyes can be detected by a known face recognition method.

The sound type determination unit 9i determines whether the external sound contained in the audio acquired by the audio acquisition unit 9e belongs to a predetermined sound type. That "the external sound belongs to a predetermined sound type" is an example of the dummy video transmission start condition described above. For example, as the "predetermined sound type", a frequency distribution indicating "chime" or "ringtone of mobile phone" is previously registered. Then, the sound type determination unit 9i, for example, compares the registered frequency distribution with a frequency distribution of the external sound contained in the audio acquired by the audio acquisition unit 9e, and determines that the external sound belongs to the predetermined sound type when the similarity is equal to or greater than the preset threshold value.

The output control unit 9f is triggered when the predetermined action of the capturing target person is detected by the action detection unit 9h during the output of the real-time video acquired by the video acquisition unit 9a, and outputs the dummy video instead of the real-time video. Thus, if the user of the video transmitting side just performs the predetermined action, the dummy video instead of the real-time video can be transmitted. Alternatively, the output control unit 9f is triggered when the external sound is determined as belonging to the predetermined sound type by the sound type determination unit 9i during the output of the real-time video acquired by the video acquisition unit 9a, and outputs the dummy video instead of the real-time video. Thus, the dummy video instead of the real-time video can be transmitted even if the user of the video transmitting side does not perform any special action. Therefore, it is possible to save time and effort of the user of the video transmitting side.

Incidentally, the output control unit 9f may be configured to be triggered when a predetermined operation button (for example, a dummy video transmission start button) is pressed by the capturing target person during the output of the real-time video acquired by the video acquisition unit 9a, and output the dummy video instead of the real-time video. In this case, the operation button causing the trigger may be configured to be arbitrarily set among a plurality of operation buttons by the user.

The change detection unit 9j detects the change in the capturing target person appearing in the real-time video, which is acquired by the video acquisition unit 9a during the output of the dummy video, from the real-time video. Examples of the change in the capturing target person may include a change in the number of capturing target person (for example, a change from 1 to 2 in the number of capturing target persons captured by the camera 1), and a change in the action of the capturing target person (for example, a change caused by a case where the capturing target person leaves his or her seat). For example, as in the video determination unit 9c, the change detection unit 9j tracks the person region from the real-time video, monitors a change in the tracked person region from a plurality of image frames containing the tracked person region, and detects a change in the capturing target person when the change is equal to or greater than a preset threshold value. Then, the video storage control unit 9b stores a video (hereinafter, referred to as "change process video) of an interval indicating the process of the change detected by the change detection unit 9j (for example, the process of the change from 1 to 2 in the number of the capturing target persons captured by the camera 1), in a change assumption video storage area distinguished from the real-time video storage area and the dummy video storage area. In this case, the output control unit 9f outputs the change process video following the dummy video. Then, the output control unit 9f is switched to output the real-time video when the change process video stored in the change assumption video storage area is all output. That is, in a case where there is a great change in the real-time video of the user of the video transmitting side during the output of the dummy video (for example, an increase from 1 to 2 in the number of capturing target persons captured by the camera 1), the change process video during the occurrence of the great change is transmitted following the dummy video. When the transmission of the change process video is completed, the real-time video (or the dummy video) after the occurrence of the great change is transmitted. That is, since the videos before and after the change in the capturing target person can be naturally connected, it is possible to avoid giving an uneasy feeling to the user of the video receiving side. Also, it is possible to prevent a video in which the capturing target persons is, for example, increased, from being suddenly displayed on the communication terminal Tn of the communication partner.

The speech determination unit 9k determines whether the capturing target person appearing in the real-time video acquired by the video acquisition unit 9a is in a situation of speech. For example, in a case where it is detected that a name of the capturing target person is called, it is determined that the capturing target person is in a situation of speech. That the name of the capturing target person is called can be determined from the audio signal acquired by the audio acquisition unit 9e. Also, for example, in a case where a terminal of a manager and the communication terminal Tn are configured to be communicable, the speech determination unit 9k may be configured to receive a speech request from the terminal of the manager and determine that the capturing target person is in a situation of speech. Incidentally, the speech request is transmitted from the terminal, for example, when the speech of the capturing target person is designated by a button in the terminal of the manager. Then, in a case where it is determined by the speech determination unit 9k that the capturing target person is in a situation of speech during the output of the dummy video, the output control unit 9f outputs the dummy video indicating communication failure for a predetermined time. Herein, examples of the dummy video indicating communication failure may include a stationary dummy video, a dummy video of reducing a transmission bit rate, and the like. Thus, even in a case where the speech is suddenly requested from the user of the video receiving side during the output of the dummy video (for example, in a case where a question is asked), the dummy video is displayed to be stationary or is displayed slowly on the communication terminal Tn of the video receiving side, which allows the user of the video receiving side to recognize the communication failure. Therefore, even in a case where the user of the video transmitting side is not in a situation suitable for speech, it is possible to secure a time until the user of the video transmitting side speaks (time until switching to the real-time video).

[2. Operation of Video Telephone System S]

Figure 3:
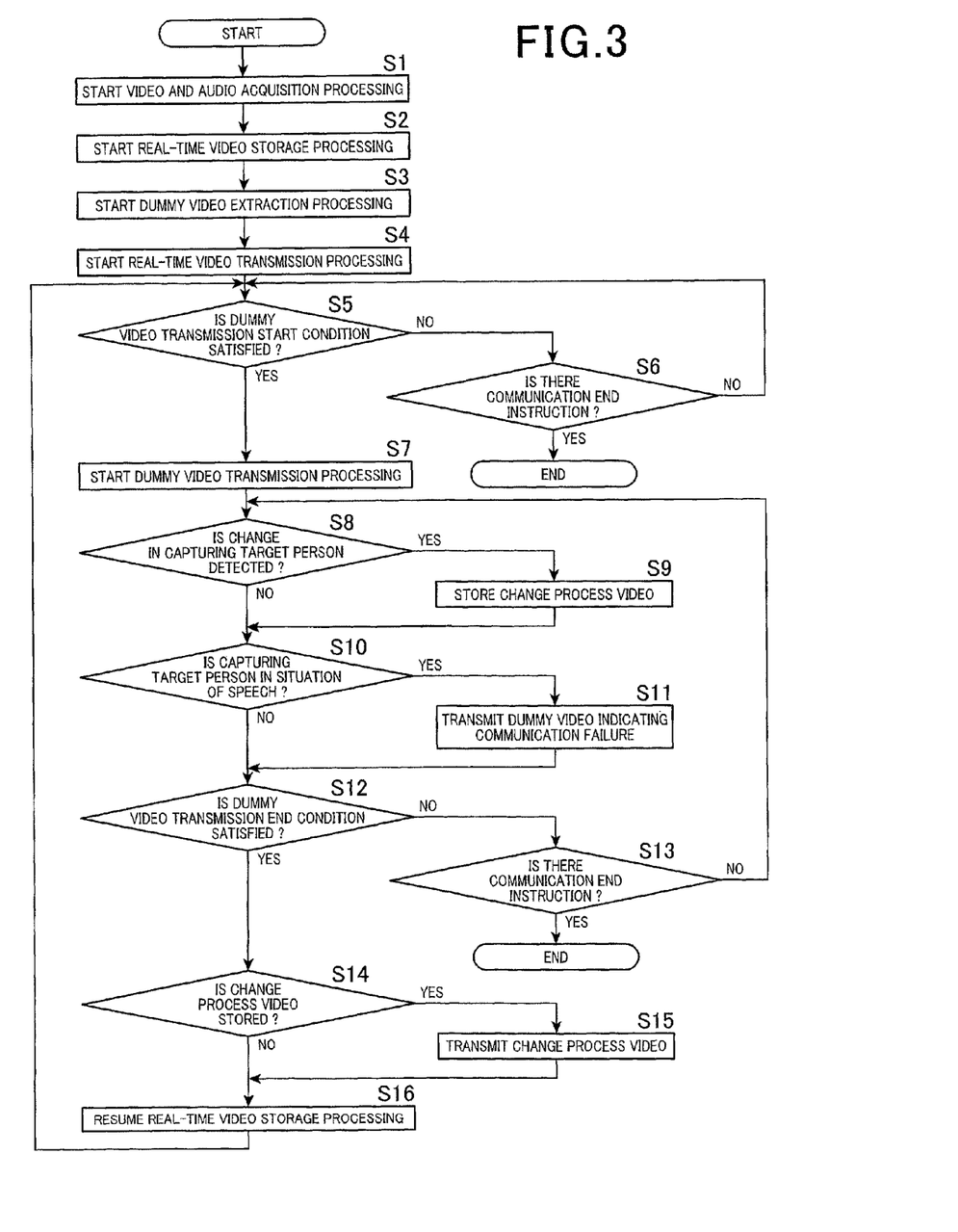
FIG. 3 is a flowchart illustrating communication processing of a control unit 9 of a communication terminal T1.

Next, the operation of the video telephone system S according to the present embodiment will be described with reference to FIG. 3. FIG. 3 is a flowchart illustrating communication processing of the control unit 9 of the communication terminal T1. The processing illustrated in FIG. 3 is started, for example, when the communication terminal T1 starts communicating with other communication terminal T2 or the like.

When the processing illustrated in FIG. 3 is started, the control unit 9 of the communication terminal T1 starts video and audio acquisition processing (step S1). In the video and audio acquisition processing, the real-time video is acquired by the video acquisition unit 9a, and the audio is acquired by the audio acquisition unit 9e. Incidentally, the video and audio acquisition processing is continued until the processing illustrated in FIG. 3 is ended.

Subsequently, the control unit 9 of the communication terminal T1 starts real-time video storage processing (step S2). In the video storage processing, the real-time video is stored in the real-time video storage area by the video storage control unit 9b. Incidentally, the real-time video storage processing is, for example, continued until the processing illustrated in FIG. 3 is ended. Also, for example, in a case where a data volume of the real-time video stored in the real-time video storage area exceeds a capacity of the real-time video storage area, the oldest real-time video stored in the real-time video storage area is overwritten by the newly acquired real-time video.

Subsequently, the control unit 9 of the communication terminal T1 starts dummy video determination processing (step S3). In the dummy video determination processing, the dummy video of the predetermined interval after the start of the video communication being currently in progress from the real-time video is determined by the video determination unit 9c. The determined dummy video is stored in the dummy video storage area. Incidentally, the dummy video determination processing is, for example, ended when a data volume of the dummy video stored in the dummy video storage area is equal to a capacity of the dummy video storage area. Also, it may be configured such that a new dummy video is determined except for only the interval during which the dummy video is output instead of the real-time video. Also, it is preferable that the dummy video is determined from the real-time video acquired within the current session from the communication start to the communication end between the communication terminal T1 and other communication terminal Tn. This is because the dummy video may be determined from the real-time video acquired in the past session, but it is thought that there are cases where the role as the dummy video may not be fulfilled because the user's clothing or hairstyle is different.

Subsequently, the control unit 9 of the communication terminal T1 starts real-time video transmission processing (step S4). In the real-time video transmission processing, the stream data containing the real-time video and the audio is transmitted to the communication terminal T2 and the like. Incidentally, the video and audio acquisition processing, the real-time video storage processing, the dummy video determination processing, and the real-time video transmission processing are, for example, simultaneously performed by a multitasking function.

Subsequently, the control unit 9 of the communication terminal T1 determines whether the dummy video transmission start condition is satisfied during the transmission of the real-time video by the real-time video transmission processing (during the output by the output control unit 9f) (step S5). For example, in a case where the user of the communication terminal T1 needs to leave his or her seat due to poor physical condition or needs to cope with an incoming call, while the video conference is being carried out through the plurality of communication terminals Tn, the dummy video transmission start condition is determined as being satisfied when the user presses the "dummy video transmission start button". Also, even though the dummy video transmission start button is not pressed, in a case where a chime of a front door or a ringtone of a mobile phone is rung and the sound type determination unit 9i determines that the external sound belongs to the predetermined sound type, the dummy video transmission start condition is determined as being satisfied. Also, in a case where the user of the communication terminal T1 performs a large action (for example, a standing action, or a left or right turning action) and the action of the capturing target person is detected by the action detection unit 9h, the dummy video transmission start condition is determined as being satisfied. This is because it is expected that the user will temporarily break off from the call soon.

Subsequently, when it is determined that the dummy video transmission start condition is not satisfied (NO in the step S5), the control unit 9 of the communication terminal T1 proceeds to step S6. On the other hand, when it is determined that the dummy video transmission start condition is satisfied (YES in the step S5), the control unit 9 of the communication terminal T1 proceeds to step S7. In step S6, it is determined whether there is the communication end instruction. For example, when it is determined that there is the communication end instruction from the user of the communication terminal T1 through the operation unit 6 (YES in the step S6), the processing illustrated in FIG. 3 is ended. On the other hand, when it is determined that there is no communication end instruction (NO in the step S6), the processing returns to step S5.

In step S7, the control unit 9 of the communication terminal T1 starts dummy video transmission processing. That is, the dummy video transmission processing is triggered and started when the dummy video transmission start condition is satisfied. In the dummy video transmission processing, the stream data containing the dummy video instead of the real-time video is transmitted to the communication terminal T2 and the like. In this case, it is preferable that the audio (real-time audio) acquired by the audio acquisition unit 9e is disconnected (not transmitted). This is done so as not to give an uneasy feeling to the user of the communication terminal T2 and the like of the communication partner due to the transmission of the audio having no relation to the dummy video. Also, in the dummy video transmission processing, as described above, it may be configured such that the real-time video is transmitted by replacing a partial region of the real-time video with a partial region containing the capturing target person appearing in the dummy video.

Incidentally, after the start of the dummy video transmission processing, the control unit 9 of the communication terminal T1 may be configured to transmit the dummy video matched with the action of the communication partner side, which is indicated by the information acquired by the information acquisition unit 9d, to the communication terminal T2 and the like of the communication partner. For example, when the action of the communication partner side is the laughing action, the dummy video containing the laughing action is transmitted. Alternatively, when the action of the communication partner side is the applauding action, the dummy video containing the applauding action is transmitted.

Subsequently, the control unit 9 of the communication terminal T1 determines whether the change in the capturing target person appearing in the real-time video acquired by the video acquisition unit 9a is detected by the change detection unit 9j during the transmission of the dummy video (step S8). Then, when the change in the capturing target person appearing in the real-time video (for example, change from 1 to 2 in the number of capturing target persons captured by the camera 1) is detected (YES in the step S8), the control unit 9 of the communication terminal T1 proceeds to step S9. On the other hand, when the change in the capturing target person appearing in the real-time video is not detected (NO in the step S8), the control unit 9 of the communication terminal T1 proceeds to step S10.

In step S9, the control unit 9 of the communication terminal T1 stores the change process video of the interval indicating the process of the detected change in the change assumption video storage area, and proceeds to step S10. In step S10, the control unit 9 of the communication terminal T1 determines whether the capturing target person appearing in the real-time video acquired by the video acquisition unit 9a is in a situation of speech by the speech determination unit 9k during the transmission of the dummy video. Then, when it is determined that the capturing target person appearing in the real-time video is in a situation of speech (for example, when the calling of the name of the capturing target person is detected) (YES in the step S10), the control unit 9 of the communication terminal T1 proceeds to step S11. On the other hand, when it is determined that the capturing target person appearing in the real-time video is not in a situation of speech (NO in the step S10), the control unit 9 of the communication terminal T1 proceeds to step S12. In step S11, the control unit 9 of the communication terminal T1 transmits the dummy video indicating communication failure to the communication terminal Tn of the communication partner for a predetermined time, and proceeds to step S12.

Incidentally, in a case where the transmission of the entire dummy video stored in the dummy video storage area determined by the video determination unit 9c is completed during the transmission of the dummy video, the control unit 9 of the communication terminal T1 repetitively transmits the already transmitted dummy video to the communication terminal T2 and the like. That is, when the dummy video stored in the dummy video storage area is insufficient, the dummy video is repetitively transmitted so as to make joints smooth. Therefore, even in a case where the transmission time of the dummy video is increased and the dummy video is insufficient, the transmission of the dummy video can be continued.

In step S12, the control unit 9 of the communication terminal T1 determines whether the dummy video transmission end condition is satisfied during the transmission of the dummy video. For example, when the predetermined operation button (for example, the dummy video transmission end button) is pressed by the user of the communication terminal T1, it is determined that the dummy video transmission end condition is satisfied. Incidentally, for example, if the agenda of the video conference is determined and the time at which the user of the communication terminal T1 has to speak is known in advance, the user may set a timer by operating the operation unit 6. In this case, when the time set by the user arrives, the control unit 9 of the communication terminal T1 determines that the dummy video transmission end condition is satisfied. Then, when it is determined that the dummy video transmission end condition is not satisfied (NO in the step S12), the control unit 9 of the communication terminal T1 proceeds to step S13. On the other hand, when it is determined that the dummy video transmission end condition is satisfied (YES in the step S12), the control unit 9 of the communication terminal T1 proceeds to step S14. In step S13, it is determined whether there is the communication end instruction. Subsequently, when it is determined that there is the communication end instruction (YES in the step S13), the processing illustrated in FIG. 3 is ended. On the other hand, when it is determined that there is no communication end instruction (NO in the step S13), the control unit 9 of the communication terminal T1 returns to step S8.

In step S14, the control unit 9 of the communication terminal T1 determines whether the change process video is stored in the change assumption video storage area in the step S9. Subsequently, when it is determined that the change process video is stored in the change assumption video storage area (YES in the step S14), the control unit 9 of the communication terminal T1 ends the dummy video transmission processing and proceeds to step S15. On the other hand, when it is determined that the change process video is not stored in the change assumption video storage area (NO in the step S14), the control unit 9 of the communication terminal T1 ends the dummy video transmission processing and proceeds to step S16. In step S15, the control unit 9 of the communication terminal T1 transmits the change process video stored in the change assumption video storage area to the communication terminal Tn of the communication partner, and proceeds to step S16 after the completion of the transmission. In step S16, the control unit 9 of the communication terminal T1 resumes the real-time video transmission processing and returns to step S5.

As described above, according to the embodiments, the communication terminal Tn is configured to be triggered when the predetermined start condition is satisfied during the output of the real-time video acquired by the camera 1, and output the dummy video of the predetermined interval after the start of the video communication being currently in progress, instead of the real-time video. Therefore, the user of the video transmitting side can transmit, for example, the video (dummy video) indicating the participation in the conference or the like, making it possible to avoid giving an uneasy feeling or the like to the user of the video receiving side.

Incidentally, in the embodiments, the case where the acquiring means, the storage controlling means, the determining means, the outputting means, and the like according to the present invention are provided in the communication terminal Tn has been described as an example, but they may be provided in a mediation device (for example, a server or a set-top box connected to the network NW) interposed between the communication terminal of the video transmitting side and the communication terminal of the video receiving side. In this case, for example, the mediation device acquires the real-time video captured by the camera 1 from the communication terminal T1, stores the acquired real-time video in the video storage area, and transmits the real-time video to the communication terminal T2 and the like. Then, the mediation device extracts the dummy video of the predetermined interval, during which the capturing target person appears, from the video stored in the video storage area, is triggered when the above-described dummy video transmission start condition is satisfied during the output of the real-time video, and transmits the extracted dummy video to the communication terminal T2 instead of the real-time video. Incidentally, in this case, the information for determining whether the dummy video transmission start condition is satisfied is acquired from the communication terminal T1. Also, the acquiring means, the storage controlling means, the determining means, the outputting means, and the like according to the present invention, for example, may be provided in an external device that can be connected to the communication terminal Tn through an interface such as a USB.

Also, in the embodiments, the scene in which the plurality of users makes the two-way video telephone call by applying the present invention to the video telephone system is assumed, but the present invention can also be applied to, for example, a one-way communication system such as e-learning.

REFERENCE-SIGN LIST 1 camera
2 microphone
3 display unit 4 audio output unit
5 storage unit
6 operation unit
7 communication unit
8 input/output interface unit
9 control unit
Tn communication terminal
S video telephone system

The invention claimed is:

1. An information processing apparatus, which outputs a video captured by a camera to a video display device in a video communication performed between the information processing apparatus and the video display device through a network, the information processing apparatus comprising:
at least one memory configured to store computer program code;
at least one processor configured to access said memory, read said computer program code, and execute according to said computer program code,
said computer program code comprising:
acquiring code configured to cause at least one of said at least one processor to acquire the video captured by the camera;
storing code configured to cause at least one of said at least one processor to store at least apart of the video acquired according to the acquiring code;
deciding code configured to cause at least one of said at least one processor to decide whether a predetermined start condition is satisfied during the output of the video captured by the camera;
determining code configured to cause at least one of said at least one processor to, during a period after a start of a video and until the predetermined start condition is decided to be satisfied in accordance with the deciding code during the output of the video captured by the camera, determine at least a part of a video of an interval after a start of a video communication being currently in progress and which does not output a replacement video from the video stored according to the storing code and captured by the camera, as the replacement video; and
outputting code configured to cause at least one of said at least one processor to, when the predetermined start condition is decided to be satisfied during the output of the video captured by the camera in accordance with the deciding code, output the replacement video determined according to the determining code instead of the video acquired according to the acquiring code.

2. The information processing apparatus according to claim 1, wherein:
said computer program code further comprises first detecting code configured to cause at least one of said at least one processor to detect a change in a capturing target person appearing in the video acquired according to the acquiring code from the video during the output of the replacement video,
the storing code is further configured to cause at least one of said at least one processor to store at least a video of an interval, which indicates a process of the change detected according to the first detecting code, and
the outputting code is further configured to cause at least one of said at least one processor to output the video of the interval indicating the process of the change following the replacement video.

3. The information processing apparatus according to claim 1, wherein:
said computer program code further comprises information acquiring code configured to cause at least one of said at least one processor to acquire information indicating an action of a person watching the video displayed by the video display device, and
the outputting code is further configured to cause at least one of said at least one processor to output the replacement video which is matched with an action indicated by the information acquired according to the information acquiring code, instead of the video captured by the camera.

4. The information processing apparatus according to claim 1, wherein:
said computer program code further comprises second detecting code configured to cause at least one of said at least one processor to detect a predetermined action of the capturing target person appearing in the video acquired according to the acquiring code, from the video, and
the outputting code is further configured to cause at least one of said at least one processor to, when the predetermined action is detected according to the second detecting code during the output of the video captured by the camera, output the replacement video instead of the video captured by the camera.

5. The information processing apparatus according to claim 1, wherein:
said computer program code further comprises first determining code configured to cause at least one of said at least one processor to determine whether a sound generated at a place where the capturing target person appearing in the video acquired according to the acquiring code belongs to a predetermined sound type, and
the outputting code is further configured to cause at least one of said at least one processor to, when it is determined according to the first determining code that the sound belongs to the predetermined sound type during the output of the video captured by the camera, output the replacement video instead of the video captured by the camera.

6. The information processing apparatus according to claim 1, wherein:
said computer program code further comprises second determining code configured to cause at least one of said at least one processor to determine whether the capturing target person appearing in the video acquired according to the acquiring code is in a situation of speech, and
the outputting code is further configured to cause at least one of said at least one processor to output the replacement video indicating communication failure when it is determined according to the second determining code that the capturing target person is in a situation of speech during the output of the video captured by the camera.

7. The information processing apparatus according to claim 1, wherein the outputting code is further configured to cause at least one of said at least one processor to, when the output of the entire replacement video determined according to the determining code is completed during the output of the replacement video, repetitively output the already output replacement video.

8. The information processing apparatus according to claim 1, wherein the outputting code is further configured to cause at least one of said at least one processor to output a video in which a partial region of the video captured by the camera is replaced with a partial region containing the capturing target person appearing in the replacement video.

9. An information processing method, which is executed by a computer comprising a storing unit and outputting a video captured by a camera to a video display device in a video communication performed between the computers and the video display device through a network, the information processing method comprising:
- a step of acquiring the video captured by the camera;
- a step of storing at least a part of the acquired video in the storing unit;
- a step of deciding whether a predetermined start condition is satisfied during the output of the video captured by the camera;
- a step of determining, during a period after a start of a video and until the predetermined start condition is decided to be satisfied in the deciding step during the output of the video captured by the camera, at least a part of a video of an interval after a start of a video communication being currently in progress and which does not output a replacement video from the video stored in the storing unit and captured by the camera, as the replacement video; and
- a step of, when the predetermined start condition is decided to be satisfied in the deciding step during the output of the video captured by the camera, outputting the replacement video determined in the determining step instead of the video acquired in the acquiring step.

10. A non-transitory computer-readable medium having an information processing program recorded thereon, the information processing program causing a computer, the computer being configured to comprise a storage and output a video captured by a camera to a video display device in a video communication performed between the computer and the video display device through a network, to execute:
- a step of acquiring the video captured by the camera;
- a step of storing at least a part of the acquired video in the storing unit;
- a step of deciding whether a predetermined start condition is satisfied during the output of the video captured by the camera;
- a step of determining, during a period after a start of a video and until the predetermined start condition is decided to be satisfied in the deciding step during the output of the video captured by the camera, at least apart of a video of an interval after a start of a video communication being currently in progress and which does not output a replacement video from the video stored in the storing unit and captured by the camera, as the replacement video; and
- a step of, when the predetermined start condition is decided to be satisfied in the deciding step during the output of the video captured by the camera, outputting the replacement video determined in the determining step instead of the video acquired in the acquiring step.

11. The information processing apparatus according to claim 2, wherein:
- said computer program code further comprises information acquiring code configured to cause at least one of said at least one processor to acquire information indicating an action of a person watching the video displayed by the video display device, and
- the outputting code is further configured to cause at least one of said at least one processor to output the replacement video which is matched with an action indicated by the information acquired according to the information acquiring code, instead of the video captured by the camera.

12. The information processing apparatus according to claim 11, further comprising:
- a second detecting unit that detects a predetermined action of the capturing target person appearing in the video acquired by the acquiring unit, from the video,
- wherein the outputting unit, when the predetermined action is detected by the second detecting unit during the output of the video captured by the camera, and outputs the replacement video instead of the video captured by the camera.

13. The information processing apparatus according to claim 11, further comprising:
- a first determining unit that determines whether a sound generated at a place where the capturing target person appearing in the video acquired by the acquiring unit belongs to a predetermined sound type,
- wherein the outputting unit, when it is determined by the first determining unit that the sound belongs to the predetermined sound type during the output of the video captured by the camera, outputs the replacement video instead of the video captured by the camera.

14. The information processing apparatus according to claim 11,
- wherein the outputting unit outputs a video in which a partial region of the video captured by the camera is replaced with a partial region containing the capturing target person appearing in the replacement video.

15. The information processing apparatus according to claim 2, wherein:
- said computer program code further comprises second detecting code configured to cause at least one of said at least one processor to detect a predetermined action of the capturing target person appearing in the video acquired by the acquiring unit, from the video, and
- the outputting code is further configured to cause at least one of said at least one processor to, when the predetermined action is detected according to the second detecting code during the output of the video captured by the camera, output the replacement video instead of the video captured by the camera.

16. The information processing apparatus according to claim 2, wherein:
- said computer program code further comprises first determining code configured to cause at least one of said at least one processor to determine whether a sound generated at a place where the capturing target person appearing in the video acquired according to the acquiring code belongs to a predetermined sound type, and
- the outputting code is further configured to cause at least one of said at least one processor to, when it is determined according to the first determining code that the sound belongs to the predetermined sound type during the output of the video captured by the camera, output the replacement video instead of the video captured by the camera.

17. The information processing apparatus according to claim 2, wherein the outputting code is further configured to cause at least one of said at least one processor to output a video in which a partial region of the video captured by the camera is replaced with a partial region containing the capturing target person appearing in the replacement video.

18. The information processing apparatus according to claim 3, wherein:
- said computer program code further comprises second detecting code configured to cause at least one of said at least one processor to detect a predetermined action of the capturing target person appearing in the video acquired according to the acquiring code, from the video, and the outputting code is further configured to cause at least one of said at least one processor to, when the predetermined action is detected according to the second detecting code during the output of the video captured by the camera, output the replacement video instead of the video captured by the camera.

19. The information processing apparatus according to claim 3, wherein:

said computer program code further comprises first determining code configured to cause at least one of said at least one processor to determine whether a sound generated at a place where the capturing target person appearing in the video acquired according to the acquiring code belongs to a predetermined sound type, and the outputting code is further configured to cause at least one of said at least one processor to, when it is determined according to the first determining code that the sound belongs to the predetermined sound type during the output of the video captured by the camera, output the replacement video instead of the video captured by the camera.

20. The information processing apparatus according to claim 3, wherein the outputting code is further configured to cause at least one of said at least one processor to output a video in which a partial region of the video captured by the camera is replaced with a partial region containing the capturing target person appearing in the replacement video.

* * * * *